United States Patent [19]

Black

[11] 4,256,811
[45] Mar. 17, 1981

[54] COATING COMPOSITION FOR STEEL CONTAINING ZINC METAL, ZINC OXIDE, MOLYBDENUM SULFIDE, A RESIN AND A SOLVENT

[75] Inventor: Archie L. Black, Dandenong, Australia

[73] Assignee: Placer Exploration Limited, Dandenong, Australia

[21] Appl. No.: 57,750

[22] Filed: Jul. 16, 1979

[30] Foreign Application Priority Data

Jul. 28, 1978 [AU] Australia ............................ PD5269

[51] Int. Cl.$^3$ .................... C09D 5/08; C10M 7/26; B22F 7/04
[52] U.S. Cl. .................... 428/562; 260/29.3; 427/327; 427/328; 427/334; 427/387; 427/388.4; 427/397.7; 427/374.1; 428/457; 428/469; 252/26; 427/383.1; 427/388.2
[58] Field of Search .............. 106/1.17; 428/469, 457, 428/562; 260/29.3; 427/327, 328, 334, 372 A, 374 R, 383 R, 387, 388 A, 388 C; 252/26

[56] References Cited

U.S. PATENT DOCUMENTS

| | | | |
|---|---|---|---|
| 3,239,288 | 3/1966 | Campbell et al. | 308/199 |
| 3,935,114 | 1/1976 | Donaho | 252/18 |
| 3,944,712 | 3/1976 | Kuncy | 106/1.17 |
| 3,994,697 | 11/1976 | Bunks | 44/51 |

OTHER PUBLICATIONS

Hackh's Chemical Dictionary, McGraw-Hill, NY, 1944, p. 534.

*Primary Examiner*—Maurice J. Welsh
*Attorney, Agent, or Firm*—Sheridan, Ross, Fields & McIntosh

[57] ABSTRACT

A coating composition which exhibits lubricating and corrosion resistance properties and is particularly suitable for coating bolts and fasteners. The composition comprises 5 to 20 parts by weight of zinc metal, 1 to 20 parts by weight of zinc oxide and 10 to 40 parts by weight molybdenum sulfide dispersed in a resin and solvent carrier such as methylated spirit and a phenolic resin.

10 Claims, No Drawings

COATING COMPOSITION FOR STEEL CONTAINING ZINC METAL, ZINC OXIDE, MOLYBDENUM SULFIDE, A RESIN AND A SOLVENT

This invention relates to an improved coating composition particularly for use on fasteners and bolts used in the mining industry.

In order to improve the efficiency of bolts and fasteners it is usual to coat them with a lubricant to lower the co-efficient of friction and to thus gain greater tension with a lower torsional force applied to the bolt. There are numerous bolts and fasteners used in mining equipment and on mining installations. Further mine roof bolts are also able to be improved. By increasing the tensile force with lower stress on the bolt fewer bolts are required for any given structure.

An additional problem, to which fasteners used in the mining industry are subjected, is the corrosive effect of mine water.

In the past various lubricants or low wear greases have been proposed for use in journal bearings, internal combustion engines but none of these have been particularly suitable in solving the problems associated with fasteners such as mining roof bolts. Typical of these prior proposed compositions are those disclosed in U.S. Pat. Nos. 3,239,288, 3,935,114 and 3,994,697.

It is, therefore, an object of this invention to provide a coating composition which provides a lower co-efficient of friction for the surface coated and also provides corrosion resistance.

To this end the present invention provides a solid lubricant and corrosion inhibiting composition 5 to 20 parts by weight of zinc metal 1 to 20 parts by weight of zinc oxide and 10 to 40 parts by weight of molybdenum sulfide dispersed in resin and solvent carrier. The zinc metal is preferably in the form of zinc dust and the Molybdenum disulfide is preferably in powder form.

The composition is preferably admixed with a resin and solvent carrier such as an alcohol water mixture with a phenolic resin. One preferred carrier includes 41 parts commercial methylated spirits, 3.5 parts water with twenty two parts phenolic resin. However, the selection of solvent or resin is not critical to the performance of the invention. ("Methylated spirits" refer to preparations as defined by Hackh's Chemical Dictionary: "rectified spirit (qv) denatured by the addition of ten percent crude wood spirit, 0.4 percent of mineral naptha or pyridine and a purple coloring matter.")

The composition is applied by dipping the parts in the composition. Prior to dipping in the composition of this invention the surfaces of the fasteners are cleaned and treated to give, for example, a ferrous manganese phosphate coating. One suitable pretreatment process is that described in Australian Pat. No. 256,993.

Subsequent to coating with the composition of this invention it is cured. Preferably curing is carried out at a temperature of 180° C. for approximately one hour. The final cured coating is generally of a thickness of from 0.01 mm to 0.02 mm.

In a preferred aspect of the present invention a sealing compound is applied over the heat treated coating. The purpose of the sealing compound is to fill the pores in the coating created by the evaporation of the solvent for the coating composition during heat treatment. Conventional sealing compositions for steel products can be used. However, according to a more preferred form of the invention a sealing composition is provided which includes a major portion of a grease formed from an alumino silicate clay and a hydrocarbon oil, and a minor portion of a water repellant compound and a rust inhibiting agent. This composition is preferably applied as a dispersion in a suitable hydrocarbon solvent.

The following example is a formulation including only two of the three essential components of the coating compound of this invention and is provided for comparative purposes.

EXAMPLE 1

| | |
|---|---|
| Methylated Spirits | 40.7% wt. |
| Union Carbide Phenolic Resin BKR 2620 | 21.7% |
| Water | 3.5% |
| Union Carbide Resin XYHL | 0.4% |
| Zinc Oxide Powder | 5.2% |
| MoS$_2$ Powder | 28.5% |
| | 100.0 |
| SEALING COMPOUND | |
| Steetly Steel Improvement 12B | |
| Mixed 1 Part to 3 of water. | |

The following two examples are illustrative of a coating composition of this invention with a conventional sealing composition and with the preferred sealing composition of this invention.

EXAMPLE 2

| | |
|---|---|
| Methylated Spirits | 50.0% |
| Union Carbide Phenolic Resin BKR 2620 | 18.0% |
| Zinc Dust | 14.3% |
| Zinc Oxide Powder | 2.3% |
| MoS$_2$ Powder | 15.4% |
| | 100.0 |
| SEALING COMPOUND | |
| Steel Improvement 12B | |
| Mixed 1 part to 3 of water. | |

EXAMPLE 3

The coating formulation of Example 2 is used in conjunction with the following sealing composition.

| | |
|---|---|
| SEALING COMPOUND: | |
| Shell Solvent X 222 | 77.0% |
| No. 2 Benton Grease | 21.6% |
| Steetly Duomeen T.D.O. | 1.0% |
| Lubrizol 850 | 0.4% |
| | 100.0 |

Bentone Grease is a mixture of bentonite clay and an oil.

Steetly Duomeen is a long chain aliphatic diamine oleate and acts as a water repellant. Lubrizol is a commercially available rust inhibitor.

The coating and sealing compositions of Examples 1, 2 and 3 were applied to steel panels for testing of corrosion resistance. The coating procedure used is described above namely the coating composition was applied and then cured for one hour at approximately 180° C.

The sealing composition was then applied and dried.

The final coating of Example 1 was about 0.013 mm thick and that of Examples 2 and 3 was about 0.026 mm thick.

The test results for corrosion resistances are as follows:

METHOD OF TEST

The salt spray testing was carried out according to Aust. Std. K173, Part III, viz.:

| | |
|---|---|
| Sodium chloride concentration | = 50 ± 5 g/liter. |
| pH | = 6.5 – 7.2 |
| Temperature | = 35 ± 1° C. |
| Fog collection rate (80cm$^2$ area | = 1–2 ml/hour. |

RESULTS

The panels were examined at regular intervals and finally taken from the cabinet, rinsed thoroughly, dried and examined. The observations were as follows:

Two plain panels coated with the composition of Example I 96,168 and 240 hours: There were no rust spots on either.
312 hours: They both exhibited a few small rust spots associated with rust staining.
408 hours: One exhibited many rust spots associated with rust staining, the other exhibited rust on approx. 10% of the surface.

Two plain panels coated with the composition of Example 2

96 and 168 hours: There were no rust spots on either.
240 hours: There were a few tiny rust spots on both.
312 hours: There were many small rust spots on both.
408 hours: There were many small rust spots on both associated with rust staining.

Two plain panels coated with the composition of Example 3

96,168,240, 312 and 408 hours: There were no rust spots on either.

One punched panel coated with the composition of Example 3 and containing 3 centre punchings 48 hours: There was no visible rust at the punch marks.
96,144,194, 264 hours: There was rust at one punch mark, none at the other two.
360 hours: As at 264 hours, but also a few tiny rust spots on the face.

These results show that although under the testing conditions the composition of this invention as illustrated in Example 2 was not superior to that of Example 1 after short periods of exposure to salt corrosion. The longer periods of exposure do illustrate the superiority of the coating composition of this invention and this means that the articles so coated will remain serviceable for far greater periods than conventionally treated products.

Another important aspect of the present invention which is particularly applicable to coated bolts, etc. is that the coating of this invention also acts as a solid lubricant and significantly reduces the tensioning torque required to provide a given tension in a tightened bolt. This significantly reduces the effort involved in assembly or disassembly of bolted components.

The co-efficient of friction of the compositions of Examples 1, 2 and 3 was 0.08 compared to 0.15 for plain steel. This torque is also 50% lower than for lightly oiled plain steel.

Bolts or fasteners treated according to this invention exhibit both improved long term corrosion resistance and a lower surface co-efficient of friction compared to untreated fasteners or fasteners coated with conventional compositions.

The process and composition of this invention can be applied to general purpose nuts and bolts used in electric and telephone transmission lines, in conveyor structures, mechanical equipment, underground mining equipment, petroleum and chemical plant equipment such as pipe line flanges and heat exchangers. The present invention is also applicable to high strength structural nuts and bolts used in high rise structures, bridges and power transmission towers.

I claim:

1. A solid lubricant and corrosion inhibiting composition comprising 5 to 20 parts by weight of zinc metal, 1 to 20 parts by weight of zinc oxide and 10 to 40 parts by weight of molybdenum sulfide dispersed in resin and solvent carrier.

2. A composition as claimed in claim 1 in which the zinc metal is added to the composition as zinc dust and the molybdenum sulfide is added as molybdenum disulfide powder.

3. A composition as claimed in claim 1 or 2 in which the solvent is methylated spirit and the resin is a phenolic resin.

4. A steel article coated with a composition comprising 5 to 20 parts by weight of zinc metal, 1 to 20 parts by weight of zinc oxide and 10 to 40 parts by weight of molybdenum sulfide dispersed in a resin and solvent carrier.

5. A steel article as claimed in claim 4 wherein the zinc metal of the composition is added as zinc dust and the molybdenum sulfide is added as molybdenum disulfide powder.

6. A steel article as claimed in claim 4 or claim 5 wherein the solvent is methylated spirit and the resin is a phenolic resin.

7. A steel article as claimed in claim 4 or claim 5 which has been heated for one hour at 180° C. and subsequently coated with a sealing composition.

8. A steel article as claimed in claim 6 which has been heated for one hour at 180° C. and subsequently coated with a sealing composition.

9. A steel article as claimed in claim 7 in which the sealing composition comprises a major portion of an alumino silicate clay and hydrocarbon oil mixture and a minor portion of a water repellant and a rust inhibitor.

10. A steel article as claimed in claim 8 in which the sealing composition comprises a major portion of an alumino silicate clay and hydrocarbon oil mixture and a minor portion of a water repellant and a rust inhibitor.

* * * * *